United States Patent [19]
Rust

[11] 3,973,715
[45] Aug. 10, 1976

[54] FRICTION WELDING

[76] Inventor: Ambrose G. Rust, 228 Cedar Blvd., Pittsburgh, Pa. 15228

[22] Filed: Apr. 9, 1975

[21] Appl. No.: 566,339

Related U.S. Application Data

[63] Continuation of Ser. No. 322,112, Jan. 9, 1973, abandoned.

[52] U.S. Cl. .............................................. 228/112
[51] Int. Cl.² ................... B23K 28/00; B23K 33/00
[58] Field of Search .............. 228/2, 112, 113, 114; 156/73.5

[56] References Cited
UNITED STATES PATENTS

| | | | |
|---|---|---|---|
| 3,134,169 | 5/1964 | Hollander et al. | 228/112 |
| 3,235,162 | 2/1966 | Hollander | 228/113 |
| 3,273,233 | 9/1966 | Oberle et al. | 228/113 |
| 3,568,299 | 3/1971 | Colton et al. | 228/113 |
| 3,576,067 | 4/1971 | Loyd et al. | 228/2 X |
| 3,753,286 | 8/1973 | Lilly et al. | 228/2 X |

*Primary Examiner*—Ronald J. Shore
*Attorney, Agent, or Firm*—Irvin V. Gleim

[57] ABSTRACT

Butt welding of workpieces of similar or dissimilar materials, such as aluminum to aluminum and/or aluminum to steel, having similar or dissimilar cross sections is accomplished by a frictional welding process wherein the average relative speed of the faying surfaces is between about 4 and about 25 feet per second, the pressure urging the faying surfaces into mutual engagement is between about 7500 and about 15,000 pounds per square inch while energy is supplied to the weld area in the range between about 4000 and about 17,000 foot pounds per square inch of weld area, and the formation of the weld is achieved within about 650 milliseconds.

5 Claims, 4 Drawing Figures

FRICTION WELDING

This is a continuation of application, Ser. No. 322,112, filed Jan. 9, 1973 now abandoned.

BACKGROUND OF THE INVENTION

The present invention relates to welding and, more particularly, to friction welding of workpieces of similar and/or dissimilar materials and having similar or dissimilar cross sections.

Frictional welding techniques are known and, in general, they employ thermal energy derived from a transformation of mechanical energy by a frictional process for the generation of heat to achieve the joining together of various materials. Thus, a friction welding process generally includes causing relative rotation between workpieces to be joined together, as well as urging together the respective workpieces at mutually engaging surfaces thereof. Such relative movement between such surfaces results in the generation of sufficient heat at the interface between such surfaces to enable them to be press-forged together and to provide a bond at the weld interface.

The prior art relating to frictional welding specifies limitations requiring that the workpieces be of identical configuration and/or size or that the smaller of the workpieces be completely circumscribed by the larger. Additionally, such prior art suggests that formation of a strong bond will be prevented by oxidation of a portion of one of the faying surfaces due to its exposure to the ambient atmosphere if such portion is out of contact with the other faying surface at some time during the carrying out of a frictional welding process.

SUMMARY

Accordingly, it is a principal object of the present invention to provide an improved process obviating the above-noted limitations of the prior art, and additionally to provide further improvements over the prior art which include the use of relatively low relative speeds between the faying surfaces, as well as a reduction in the time required to effect a frictionally welded joint. In accordance with the present invention, this is achieved in a frictional welding process wherein the relative speed between faying surfaces of pieces to be welded is relatively low, energy supplied to the weld area is controlled, and the weld is completed within milliseconds from the time of initial contact between the faying surfaces.

DESCRIPTION

Other objects and advantages will become apparent from the following description taken in connection with the accompanying drawings, in which.

Figure 1:
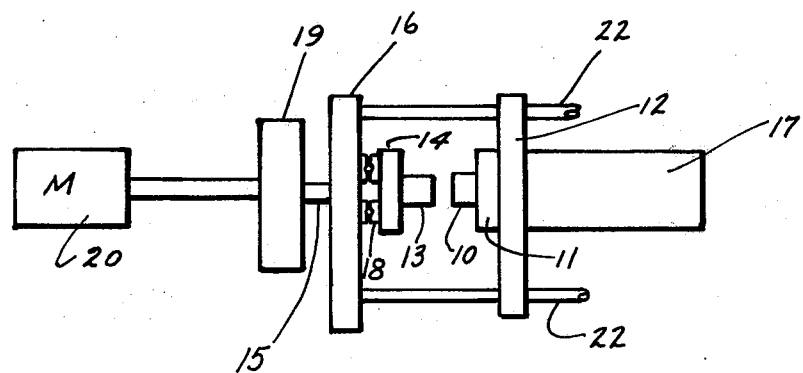
FIG. 1 is a schematic drawing of a friction welding apparatus which may be employed in practicing a friction welding process embodying the present invention.

In FIG. 1 there is shown schematically a friction welding apparatus or machine in which a workpiece 10 is held in a stationary chuck 11. The chuck is fixed to a frame member 12 slidably mounted on a pair of guide members 22.

A second workpiece 13 is held in a rotatably mounted chuck 14. The rotatably mounted chuck is fixed to a rotatable shaft 15 which extends through a stationary frame member 16.

A power cylinder 17 is connected to member 12 to urge it toward or retract it from member 16. A thrust bearing 18 takes up the axial load from chuck 14 when the cylinder is actuated to move workpieces 10 and 13 together.

The mass of the rotating elements of the welding apparatus, as represented by numeral 19 in FIG. 1, is driven by a motor 20 connected to shaft 15.

Contrary to the teachings and suggestions of the prior art, experiments have shown that workpieces of dissimilar materials and/or cross sections and/or having overhanging portions of the faying surfaces can be successfully welded together by my improved welding process. Thus, the welding of aluminum workpieces to steel workpieces and/or aluminum workpieces to aluminum workpieces are comprehended within the scope of the present invention. As used herein, aluminum includes pure aluminum as well as alloys of aluminum.

Figure 2:
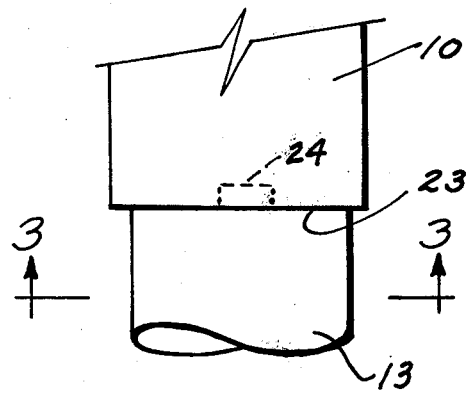
FIG. 2 is a plan view showing workpieces of dissimilar cross section welded together by a process according to the present invention.
Figure 3:
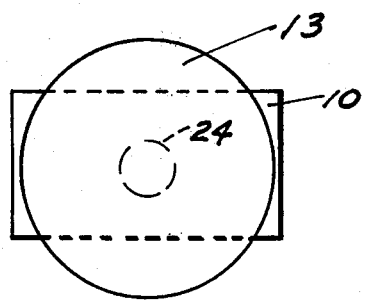
FIG. 3 is a view, looking in the direction of arrows 3—3 in FIG. 2.
Figure 4:
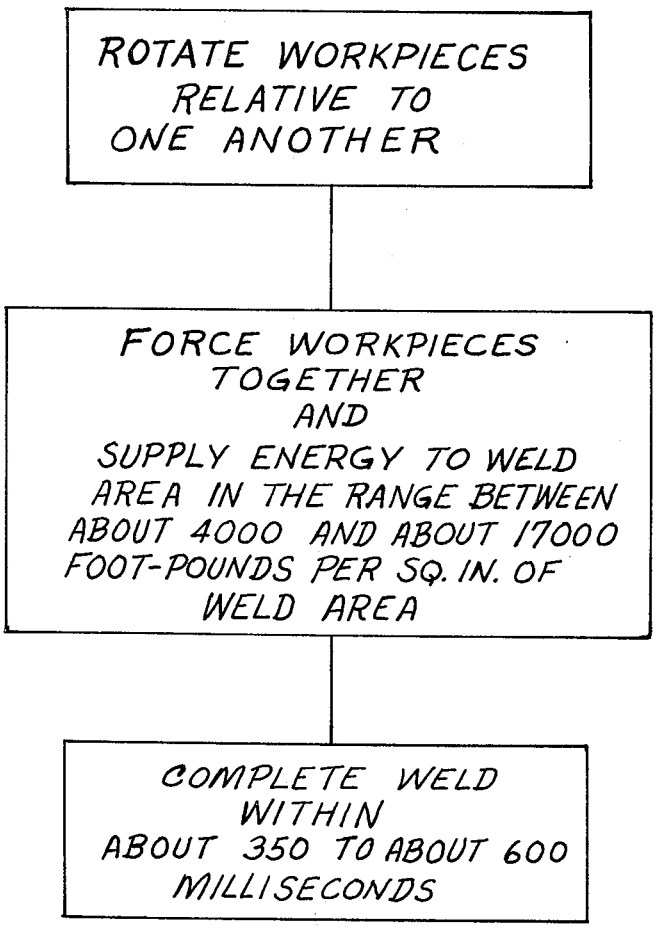
FIG. 4 is a view diagrammatically illustrating a welding process embodying the present invention.

In FIGS. 2 and 3 there is shown a workpiece 10 of rectangular cross section joined to a workpiece 13 of circular cross section along a butt joint friction weld, indicated at 23, in accordance with the present invention. For reasons which will appear hereinafter, it may be desirable to remove a circular portion 24 from one of the workpieces prior to making the welded joint.

In accordance with the present invention successful and suitable welds have been made between 4 × 7 inch bars of aluminum and 6 inch diameter aluminum bars, as well as between aluminum and steel workpieces both of circular cross section. Alloys used in the making of such welds include aluminum alloys 1100, 5005, 8076 (CK76) and 6101.

The work or energy needed to produce the weld in provided by the driving motor and by the kinetic energy of the rotating parts of the machine including the workpiece. The magnitude of this energy can be varied by changing the torque of the drive motor, the speed of rotation or the inertia of the rotating system or by a combination of these.

To produce a weld in accordance with the present invention, the magnitude of the energy delivered to the weld area should be in the range between about 4000 and about 17,000 foot pounds per square inch of weld area. For best results when welding rectangular aluminum and circular steel workpieces, the energy supplied should be in the range between about 4000 and about 12,000 foot pounds per square inch of weld area. When rectangular aluminum workpieces are to be welded to circular aluminum workpieces, best results are obtained by supplying energy to the weld area in the range between about 7500 and about 17,000 foot pounds per square inch of weld area.

The work or energy used in making the weld is calculated by the following equation:

$$We = T \int_{t_0}^{t_1} (\omega_0 \, dt + \alpha \, t \, dt) + \frac{I}{2}(\omega_0^2 - \omega_1^2)$$

where $We$ = Total Energy as expressed in foot pounds $T$ = Torque furnished to driven shaft 15 by the driving motor 20 as expressed in foot pounds $\omega_0$ = Angular velocity at start of weld as express in radians per second $\omega_1$ = Angular velocity at completion of weld or zero radians per second $\alpha$ = Angular acceleration of driven shaft 15 during weld as expressed in radians per second per second $I$ = Inertia of all rotating parts and workpieces $t_0$ = Time at start of weld (contact between workpieces)

$t_1$ = Time at end of weld (rotation stopped) in seconds

The average relative speed of the faying surfaces of the workpieces should be relatively slow prior to forcing them together, and preferably between about 4 and about 25 feet per second. For best results the formation of the weld should be completed quickly and preferably within the range of from about 350 to about 600 milliseconds. Relative speed is determined by the equation:

$$V = \frac{\pi N}{1080} \left( \frac{D_o^3 - D_i^3}{D_o^2 - D_i^2} \right)$$

where $V$ = Average relative surface speed as expressed in feet per second $N$ = Rotational speed in revolutions per minute $Do$ = Outside diameter of weld interface in inches $Di$ = Inside diameter of weld interface in inches To make the weld, the workpieces are forced together with sufficient pressure to cause their interfaces to be press-forged together and thereby provide a strong bond at the weld interface. For best results this pressure urging the workpieces together should be between about 7500 and about 15,000 pounds per square inch at the interface.

The values of the several parameters referred to herein, namely, the average relative surface speed between the faying surfaces, the unit energy required to produce a successful welded bond between workpieces, and press-forging pressure, will vary as the physical properties of one or both of the workpieces vary. In general, softer workpiece materials will require lower values of all of said parameters than do harder materials. Successful strong bonds have been produced between the workpiece materials and the ranges of parameter values set forth herein.

Since there is no relative movement between the faying surfaces at the center or axis of rotation, it may be desirable to remove a center portion 24 of one of the workpieces prior to making the weld thereby insuring that the resulting weld will be annular and also providing effective control of the area of the weld.

While particular embodiments of the invention have been illustrated and described, it will be obvious that various changes and modifications can be made without departing from the invention, and it is intended in the appended claims to cover all such changes and modifications that fall within the true spirit and scope of the invention.

What is claimed is:

1. A method of welding together surfaces of a pair of workpieces having mutually overlapping and dissimilar boundaries comprising the steps of causing relative movement between said surfaces at an average surface speed of between about 4 and about 25 feet per second, successively exposing a portion of one of said surfaces to the ambient atmosphere and thereafter excluding air from said one surface portion, urging said relatively moving surfaces together under pressure between about 7500 and about 15000 pounds per square inch and simultaneously supplying a predetermined quantity of energy of from about 4000 to about 17000 foot-pounds per square inch of weld area to one of the workpieces for frictionally heating and welding said workpieces together at the interface between said workpieces, and completing the weld within about 650 milliseconds after initial engagement is effected between said surfaces of said workpieces.

2. Method according to claim 1 wherein the weld is completed within about 350 and about 650 milliseconds.

3. Method according to claim 1 wherein both of said workpieces are formed of aluminum material.

4. Method according to claim 1 wherein one of said workpieces is formed of aluminum material and the other workpiece is steel.

5. Method according to claim 1 wherein one of said surfaces is provided with an annular inner margin.

* * * * *